United States Patent
Takizawa et al.

[11] Patent Number: 6,076,031
[45] Date of Patent: Jun. 13, 2000

[54] SPEED RATIO CONTROLLER AND CONTROL METHOD OF TOROIDAL CONTINUOUSLY VARIABLE TRANSMISSION

[75] Inventors: Satoshi Takizawa, Yokohama; Masato Koga, Atsugi; Mitsuru Watanabe, Hadano, all of Japan

[73] Assignee: Nissan Motor Co., Ltd., Yokohama, Japan

[21] Appl. No.: 09/370,883

[22] Filed: Aug. 10, 1999

[30] Foreign Application Priority Data

Aug. 10, 1998 [JP] Japan .................................. 10-225892

[51] Int. Cl.[7] .............................. G06F 7/00; F16H 15/48; F16H 61/30; B60K 41/12
[52] U.S. Cl. ................................ 701/51; 701/54; 701/68; 477/37; 477/107; 477/11; 475/254; 475/269; 475/186; 180/170; 476/10
[58] Field of Search .................................. 701/51, 54, 68; 477/11, 37, 107; 475/186, 254, 269; 180/170; 476/10

[56] References Cited

U.S. PATENT DOCUMENTS

| | | | |
|---|---|---|---|
| 4,107,776 | 8/1978 | Beale | 701/54 |
| 4,361,060 | 11/1982 | Smyth | 74/866 |
| 5,807,206 | 9/1998 | Okazaki | 477/98 |

FOREIGN PATENT DOCUMENTS

8-178063   7/1996   Japan .

Primary Examiner—Willaim A. Cuchlinski, Jr.
Assistant Examiner—Yonel Beaulieu
Attorney, Agent, or Firm—Foley & Lardner

[57] ABSTRACT

A speed ratio of a toroidal continuously variable transmission is varied by a step motor (4). The step motor (4) is responsive to a command signal Astep which a controller (61) outputs corresponding to a target speed ratio. The controller (61) is programmed to initialize the command signal Astep when it is activated while the vehicle is running (S152) such that the command signal coincides with an actual operation position of the step motor (4). The controller (61) is further programmed to limit the command signal, after performing this initialization, within a first limiting range which is narrower than a second limiting range corresponding to a physical operation limit of the step motor (4) (S168, S170). By applying such a limitation to the command signal, the command signal is prevented from exceeding the operation limit of the step motor (4) even when a torque shift error is introduced into the command signal by the initialization while the vehicle is running.

7 Claims, 9 Drawing Sheets

SPEED RATIO CONTROLLER AND CONTROL METHOD OF TOROIDAL CONTINUOUSLY VARIABLE TRANSMISSION

FIELD OF THE INVENTION

This invention relates to speed ratio control of a toroidal continuously variable transmission of a vehicle, specifically to speed ratio control when power supply to a controller is turned on while the vehicle is running.

BACKGROUND OF THE INVENTION

Speed ratio of a V-belt continuously variable transmission and a toroidal continuously variable transmission for a vehicle is generally controlled by an electronic controller via an actuator which is responsive to a command signal output by the controller. A step motor is an example of such an actuator.

Tokkai Hei 8-178063 published by the Japanese Patent Office in 1996 discloses an initializing method of the command signal so as to make the command signal coincide with the actual operation position of the step motor. The operation position of the step motor is considered to be equivalent to the real speed ratio of the transmission.

The controller according to this prior art first determines if the vehicle is running, immediately after the power supply of the controller is started. If the vehicle is not running, the controller drives the step motor to an end position in the speed ratio increase direction which is equivalent to the maximum speed ratio of the transmission. At this position, the controller initializes the command signal such that a signal to drive the step motor to this position corresponds to a signal commanding the maximum speed ratio.

It is also possible that the power supply to the controller instantaneously stops or the voltage becomes too low for the operation of the controller while the vehicle is running. On such an occasion, if the step motor is driven to the end position when the power supply is recovered, the speed ratio suddenly takes a maximum value and an undesirable downshift of the transmission occurs. When the vehicle is running, therefore, the controller initializes the command signal by a different method. That is, the current operation position of the step motor is estimated from the real speed ratio of the transmission as detected by sensors, and the command signal is modulated to coincide with the estimated operation position of the step motor.

SUMMARY OF THE INVENTION

However, a specific problem arises when the above initializing method is applied to the controller of a toroidal continuously variable transmission. In a toroidal continuously variable transmission, a real speed ratio of the transmission detected by rotation sensors and a command signal output from the controller do not necessarily correspond due to a so-called torque shift error which is specific to the toroidal continuously variable transmission.

In the toroidal continuously variable transmission, an input torque is converted into an output torque by power rollers at an arbitrary speed ratio corresponding to their gyration angle.

When an input torque varies, trunnions supporting the power rollers deform and a mechanical feedback mechanism which feeds back the movement of the trunnion to a control valve becomes erroneous. Herein, the control valve is driven by the step motor and provides oil pressure to vary the gyration angle of the power rollers. A deviation of the real speed ratio from the speed ratio designated by the command signal due to the error of the mechanical feedback mechanism is called a torque shift error. Since the transmission transmits no torque when the vehicle is not running, the torque shift error occurs only when the vehicle is running When the command signal is initialized while the vehicle is running, therefore, the accuracy of the initialization of the command signal is adversely affected by this torque shift error, and there is a possibility that the controller may output a command signal to the step motor which actually surpasses the operation limit of the step motor.

It is therefore an object of this invention to prevent a command signal from surpassing the operation limit of a motor even when the command signal is initialized while the vehicle is running.

In order to achieve the above object, this invention provides a speed ratio controller for a toroidal continuously variable transmission of a vehicle, wherein the transmission comprises a motor varying an operation position according to a command signal so as to vary a speed ratio of the transmission. The controller comprises a sensor for detecting a running condition of the vehicle, a sensor for detecting that the vehicle is running, a sensor for detecting a real speed ratio of the transmission, and a microprocessor programmed to perform, when the vehicle is running, an initialization of the command signal with respect to an actual operation position of the motor based on the real speed ratio of the transmission, determine a target speed ratio based on the running condition of the vehicle, determine the command signal based on the target speed ratio, limit the command signal within a first limiting range which is narrower than a second limiting range corresponding to a physical operation limit of the transmission, after the initialization is performed, and output the command signal after limiting, to the motor.

This invention also provides a speed ratio control method of a toroidal continuously variable transmission of a vehicle, wherein the transmission comprises a motor varying an operation position according to a command signal so as to vary a speed ratio of the transmission. The method comprises detecting a running condition of the vehicle, detecting that the vehicle is running, detecting a real speed ratio of the transmission, performing, when the vehicle is running, an initialization of the command signal with respect to an actual operation position of the motor based on the real speed ratio of the transmission, determining a target speed ratio based on the running condition of the vehicle, determining the command signal based on the target speed ratio, limiting the command signal within a first limiting range which is narrower than a second limiting range corresponding to a physical operation limit of the transmission, after the initialization is performed, and outputting the command signal after limiting, to the motor.

The details as well as other features and advantages of this invention are set forth in the remainder of the specification and are shown in the accompanying drawings.

BRIEF DESCRIPTION OF THE DRAWINGS

FIG. 6 is a flowchart describing a subroutine for calculating a speed ratio deviation RtoERR and its differential $$\frac{d}{dt} RtoERR$$

performed by the controller.

DESCRIPTION OF THE PREFERRED EMBODIMENTS

Figure 1:
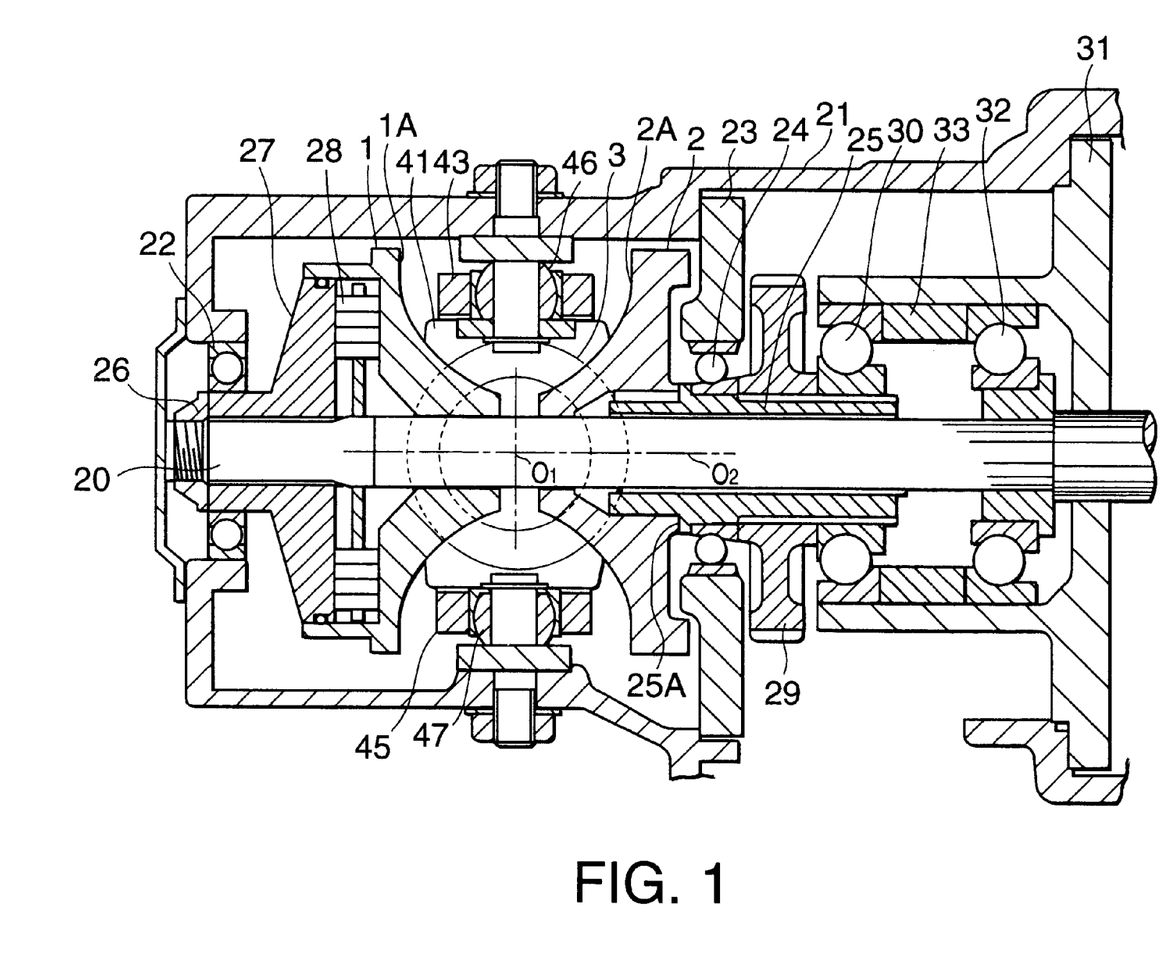
FIG. 1 is a longitudinal sectional view of a toroidal continuously variable transmission to which this invention is applied.

Referring to FIG. 1 of the drawings, a toroidal continuously variable transmission to which this invention is applied comprises an input shaft 20 and an output gear 29.

The input shaft 20 is connected to an engine of a vehicle via a torque converter. The engine and the torque converter are located on the right side of FIG. 1, but not shown. The output gear 29 outputs a rotation torque for driving the vehicle.

A cam flange 27 screws in to the tip of the input shaft 20. A nut 26 is tightened to the tip of the input shaft 20 so that the cam flange 27 is fixed to the input shaft 20.

The cam flange 27 is inserted in a cylindrically shaped back side part of an input disk 1. The input shaft 20 passes through the center of the input disk 1 leaving a small clearance. By this arrangement, the input disk 1 is maintained coaxial with the rotation shaft 20. The cam flange 27 is supported in a case 21 via a bearing 22, and the base end of the input shaft 20 is supported by an angular bearing 32.

Cam rollers 28 are disposed between the cam flange 27 and the input disk 1. The cam rollers 28 comprise cam surfaces which press the input disk 1 to the right of the figure according to the relative rotational displacement of the cam flange 27 and the input disk 1.

An output disk 2 is attached free to rotate relative to the input disk 1 on the outer circumference of the rotation shaft 20.

The input disk 1 and power output disk 2 comprise toroidal curved surfaces 1A, 1B which face each other, and a pair of power rollers 3 is gripped between these curved surfaces 1A, 1B.

The output disk 2 is spline jointed to a sleeve 25 supported on the outer circumference of the rotation shaft 20 via a needle bearing. A large diameter part 25A is formed in the sleeve 25 to support a thrust load which interacts on the power output disk 2 towards the right of FIG. 1.

The sleeve 25 is supported by an intermediate wall 23 of the case 21 via a radial bearing 24, and is also supported by an angular bearing 30. The angular bearing 30 and an angular bearing 32 are engaged inside a cylindrically-shaped cover 31 fixed to the case 21.

A spacer 33 which engages with the inside of the cover 31 is also gripped by the angular bearings 30, 32.

The thrust force exerted by the input disk 1 on the rotation shaft 3 towards the left of the drawing, and the thrust force exerted by the output disk 2 on the sleeve 25, therefore cancel each other out due to the spacers 33 gripped between the angular bearings 30, 32. Also, the load which acts on the angular bearings 30, 32 in the radial direction is supported by the cover 31.

The output gear 29 is spline jointed to the outer circumference of the sleeve 25. The rotation of the output gear 29 is transferred to the outside of the case 21 via a gear unit, not shown.

The power rollers 3 are supported by trunnions 41.

By driving the trunnions 41 in a direction perpendicular to the rotation shaft 20, the contact positions of the power rollers 3 with the input disk 1 and output disk 2 are changed. Due to this change of contact positions, a force is exerted on the power rollers 3 by the disks 1 and 2 so as to gyrate the power rollers 3 around an axis $O_3$ which causes the gyration angle of the power rollers 3 to vary. As a result, the distance of the contact point between the power rollers 3 and the input disk 1 from a center axis $O_2$ of the rotation shaft 20, and the distance of the contact point between the power rollers 3 and the output disk 2 from the axis $O_2$, vary, and a speed ratio varies accordingly. Herein, the speed ratio denotes the rotation speed of the input disk 1 divided by the rotation speed of the output disk 2

Figure 2:
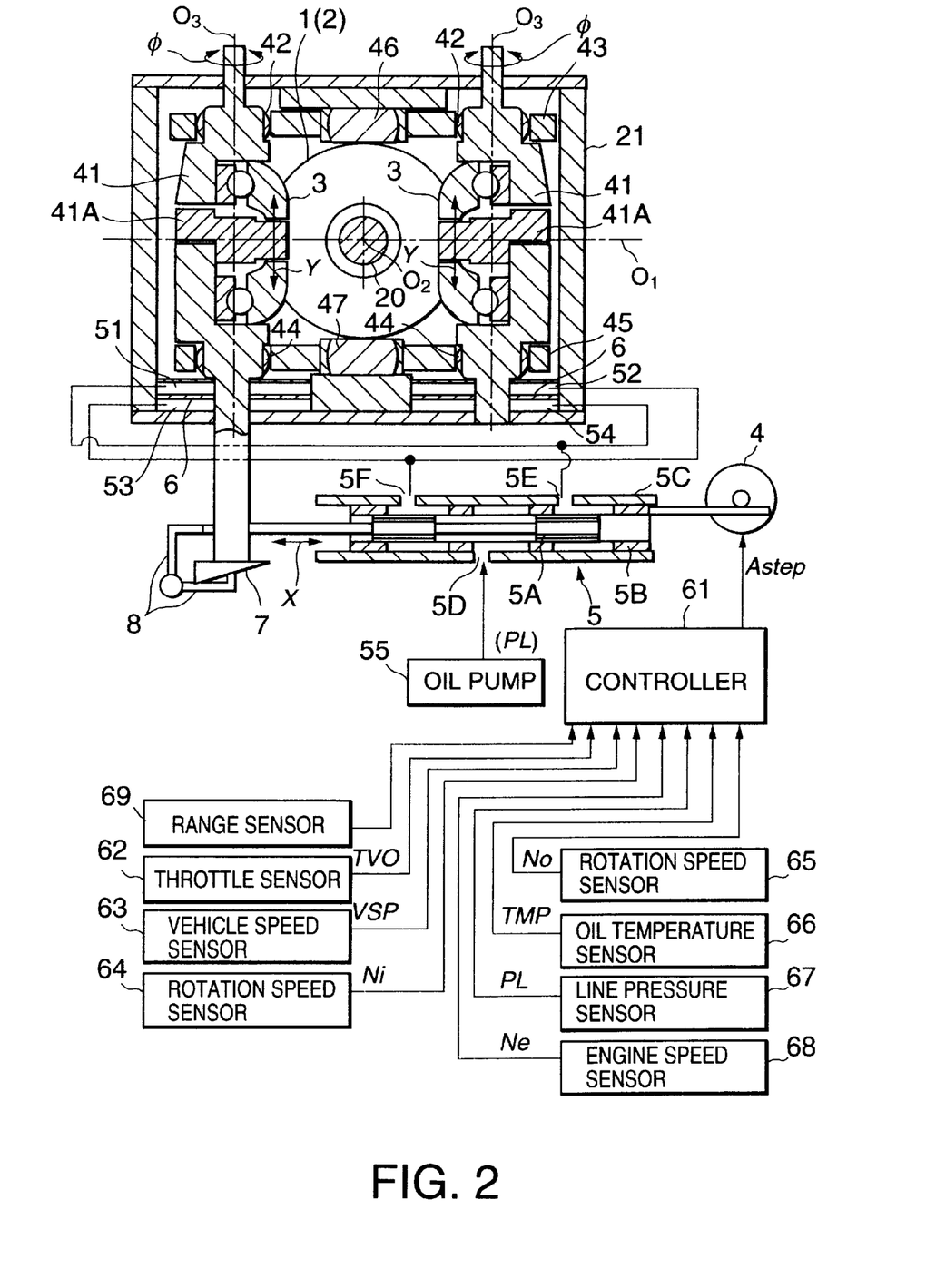
FIG. 2 is a schematic diagram of a speed ratio control device according to this invention.

Referring to FIG. 2, the trunnions 41 support the power rollers 3 such that they are free to rotate about an axis $O_1$ via a crank-shaped shaft 41A, and such that they are free to swing within a small range around the base end of the shaft 41A.

The upper end of each trunnion 41 is joined to an upper link 43 via a spherical joint 42, and a lower end is joined with a lower link 45 via a spherical joint 44. The upper link 43 and lower link 45 are supported in the case 21 via spherical joints 46 and 47, respectively. Due to these links, the pair of trunnions 41 always displace in reverse directions and by an equal distance along the axis $O_3$ of each trunnion 41.

A piston 6 is fixed to each of these trunnions 41. The piston 6 displaces the trunnion 41 along the axis $O_3$ according to an oil pressure balance of oil chambers 51, 53 and oil chambers 52, 54 which are formed in the case 21. Oil pressure is supplied to these oil chambers 51, 52, 53, and 54 from an oil pressure control valve 5.

The oil pressure control valve 5 comprises an outer sleeve 5C, inner sleeve 5B and a spool 5A which slides on the inside of the inner sleeve 5B. A port 5D which draws the pressure of an oil pump 55, port 5E connected to the oil chambers 51, 54, and port 5F connected to the oil chambers 52, 53 are formed in the outer sleeve 5C, respectively. The inner sleeve 5B is connected with a step motor 4 via a rack and pinion. Also, openings at the ends of the inner sleeve 5B are connected to drain passages, not shown.

The spool 5A is joined to a link 8. The link 8 displaces the spool 5A according to a rotational displacement around the axis $O_3$ and a displacement along the axis $O_3$ of a precess cam 7 fixed to the lower end of one of the trunnions 41, and mechanically feeds back the gyration angle of the power roller 3 to the oil pressure control valve 5.

The oil pressure control valve 5 changes the pressure supplied to the ports 5E, 5F according to a command signal Astep input to the step motor 4 from the controller 61.

For example, when the spool 5A, outer sleeve 5B and inner sleeve 5C are in the positions shown in FIG. 2, the oil chambers 52, 53 receive high pressure oil of an pressure pump 55 from the port 5F, and oil in the oil chambers 51, 54 is drained via the port 5E.

As a result, the trunnion 41 on the left of the figure moves upwards along the axis $O_3$, and the trunnion 41 on the right of the figure moves downwards along the axis $O_3$. Hence, the rotation axis $O_1$ of the power roller 3 displaces from a neutral position at which it intersects the rotation axis $O_2$ of the input disk 1 and the output disk 2, in the direction shown by the arrow Y in the drawing.

Due to this displacement, the input disk 1 and output disk 2 cause the power roller 3 together with the trunnions 41 to gyrate around the axis $O_3$ and thereby continuously vary the speed ratio.

At this time, the precess cam 7 fixed to the lower end of one trunnion 41 feeds back the displacement amount in the direction of the axis $O_3$ of the trunnion 41 and the rotational dispacement of the power roller 3 around the axis $O_3$, to the oil pressure control valve 5 via a link 8, and the spool 5A is displaced in the direction shown by the arrow X in the drawing.

When a speed ratio corresponding to the above-mentioned command signal Astep is attained by this feedback operation, the positional relationship of the spool 5A and inner sleeve 5B is restored to the neutral position wherein inflow and outflow of oil to and from all the oil chambers is stopped.

Hence, the trunnions 41 are maintained in a state where they are displaced in the direction of the axis $O_3$.

On the other hand, the power roller 3 which gyrated around the $O_3$ axis swings around the base end of the shaft 41A while maintaining the new gyration angle, and returns to the neutral position at which the axis $O_1$ and the axis $O_2$ intersect.

The reason why the precess cam 7 feeds back not only the rotational displacement around the axis $O_3$ of the power roller 3, i.e., the gyration angle, but also the axial displacement of the trunnion 41, is that the feedback of the axial displacement of the trunnion 41 works as a damping element which prevents the speed ratio control from oscillating. The command signal Astep is determined by the controller 61.

The controller 61 comprises a microprocessor comprising a central processing unit (CPU), random access memory (RAM), read-only memory (ROM) and input/output interface (I/O interface).

Signals are input to the controller 61 from a throttle sensor 62 which detects a throttle opening TVO of the engine, vehicle speed sensor 63 which detects a vehicle speed VSP, rotation speed sensor 64 which detects a rotational speed Ni of the input disk 1, rotation speed sensor 65 which detects a rotational speed No of the output disk 2, oil temperature sensor 66 which detects a temperature TMP of the above-mentioned oil, line pressure sensor 67 which detects a line pressure PL, i.e., the oil pressure which the port 5D supplies from the oil pressure pump 55, engine speed sensor 68 which detects a rotation speed Ne of the engine, and a range sensor 69 which detects an operating mode of the transmission chosen by a selector lever, not shown.

The controller 61 calculates the command signal Astep based on the above-mentioned signals and outputs it to the motor 4.

Figure 3:
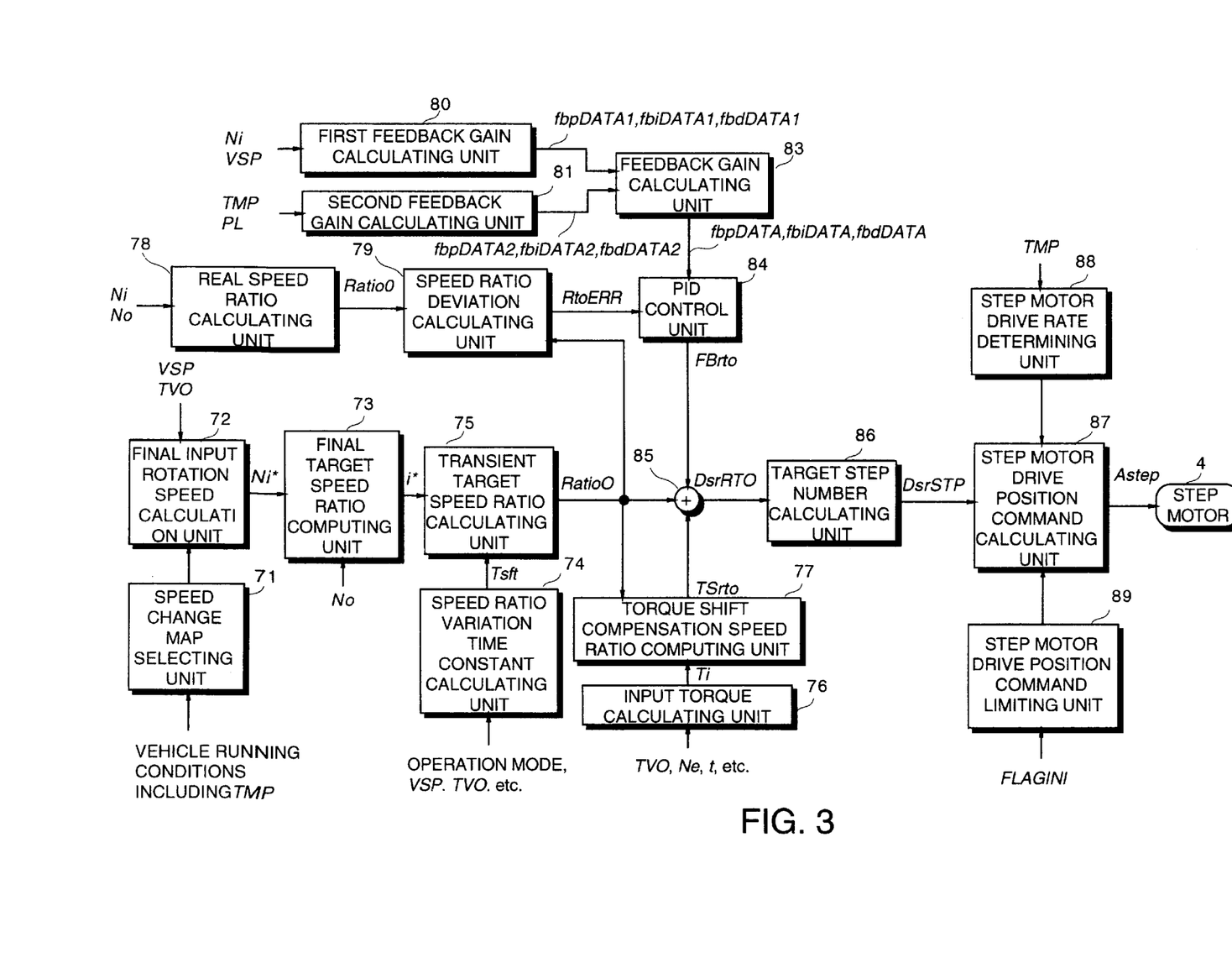
FIG. 3 is a block diagram for describing the structure of a controller according to this invention.

For this purpose, the controller 61 comprises processing units shown in FIG. 3. These units are virtual units constructed from the functions of the above-mentioned CPU, read-only memory and random access memory.

A speed ratio map selecting unit 71 selects a speed ratio map to use based on an oil temperature TMP detected by the oil temperature sensor 66, and other vehicle running conditions. In this speed ratio map, a final input rotation speed Ni* which is a final target rotation speed of the input disk 1, is defined according to the vehicle speed VSP and the throttle opening TVO. Plural maps of this kind are stored beforehand in the controller 61 with respect to various running conditions.

A final input rotation speed calculation unit 72 calculates the final target input rotation speed Ni* of the transmission based on the speed ratio map that is currently effective.

A final target speed ratio computing unit 73 divides the final input rotation speed Ni* by a rotation speed No of the output disk 2 detected by the rotation speed sensor 65, and calculates a final target speed ratio i*.

A speed ratio variation time constant calculating unit 74 determines a time constant Tsft of a speed ratio variation based on the operating mode of the transmission detected by the range sensor 69, vehicle speed VSP, throttle opening TVO, and deviation between a real speed ratio and a transient target speed ratio which will be described later.

The time constant Tsft is a constant specifying the rate of speed ratio variation until the final target speed ratio i* is attained, but as the time constant Tsft is varied dynamically in this embodiment as mentioned above, it is actually treated as a variable. The transient target speed ratio calculating unit 75 calculates a transient target speed ratio RatioO as a target value for every control cycle from the final target speed ratio i* and time constant Tsft.

An input torque calculating unit 76 calculates an engine output torque from the throttle opening TVO and engine rotation speed Ne, and calculates a torque ratio t of the torque converter from the speed ratio of the input rotation speed and output rotation speed of the torque converter. The engine output torque is then multiplied by the torque ratio so as to calculate a transmission input torque Ti.

A torque shift error correction unit 77 calculates a torque shift error correction value TSrto for correcting a torque shift error which is a phenomenon peculiar to a toroidal continuously variable transmission from the aforesaid transient target speed ratio RatioO and the transmission input torque Ti. This torque shift error will now be described.

When the toroidal continuously variable transmission is operating, the input disk 1 and output disk 2 grip the power rollers 3. This grip pressure acts as force tending to keep the power rollers 3 away from the axis $O_1$, and it deforms the trunnions 41 which support the power rollers 3. The deformation of the trunnions 41 introduces an error into the feedback operation of the precess cam 7, and produces a discrepancy between the command signal Astep input into the step motor 4 and the actual speed ratio realized by the command signal. This phenomenon is known as the torque shift error. The magnitude of the torque shift error varies according to the transient target speed ratio RatioO and transmission input torque Ti.

The torque shift error correction unit 77 calculates the torque shift correction value TSrto from the transient target speed ratio RatioO and transmission input torque Ti by looking up a map stored beforehand in the controller 61. The torque shift error correction value TSrto is input into an adder 85 together with the transient target speed ratio RatioO and a speed ratio feedback correction amount FBrto which is output from a PID control unit 84.

Next, the speed ratio feedback correction amount FBrto will be described.

To make the real speed ratio follow a target value TSRatioO, the speed ratio feedback control performed by the controller 61 adds a correction to the signal output to the step motor 4. The correction is performed by software. The feedback control performed by the above-mentioned precess cam 7 is control performed with hardware so that the speed ratio of the continuously variable transmission coincides with the command signal Astep, and is therefore different from the feedback control performed by the controller 61.

In order to perform this feedback correction, a real speed ratio calculating unit 78 computes the real speed ratio Ratio of the transmission by dividing the input rotation speed of the transmission, i.e., the rotation speed Ni of the input disk 1, by the output rotation speed, i.e., the rotation speed No of the output disk 2. A speed ratio deviation calculating unit 79 subtracts the real speed ratio Ratio from the transient target speed ratio RatioO to calculate the speed ratio deviation RtoERR.

Based on the speed ratio deviation RtoERR, a first feedback gain calculating unit 80 sets a first feedback gain for feedback controlling the speed ratio on the basis of a proportional integral differential (PID) control known in the art.

The parameters set here are a first proportional control feedback gain fbpDATA1, first integral control feedback gain fbiDATA1 and first differential control feedback gain fbdDATA1 which are set based on the transmission input rotation speed Ni and the vehicle speed VSP, respectively.

To set these first feedback gains, a two-dimensional map of each first feedback gain with the transmission input rotation speed Ni and vehicle speed VSP as parameters is stored beforehand in the controller 61, and the first feedback gain computing unit 80 calculates these first feedback gains by looking up each map based on the transmission input rotation speed Ni and the vehicle speed VSP.

The second feedback gain calculating unit 81 sets a second feedback gain based on the transmission oil temperature TMP and the line pressure PL. The parameters set here are a second proportional control feedback gain fbpDATA2, second integral control feedback gain fbiDATA2 and second differential control feedback gain fbdDATA2. These second feedback gains are also found by looking up maps stored beforehand in the controller 61.

A feedback gain calculating unit 83 then calculates the proportional control feedback gain fbpDATA, the integral control feedback gain fbiDATA and the differential control feedback gain fbdDATA by multiplying the first feedback gains by corresponding second feedback gains.

These feedback gains fbpDATA, fbiDATA and fbdDATA are input to the PID control unit 84 together with the speed ratio deviation RtoERR, calculated by the speed ratio deviation calculating unit 79.

A PID control unit 84 calculates a speed ratio feedback correction amount FBrto using the speed ratio deviation RtoERR and these feedback gains. For this purpose, a speed ratio feedback correction amount due to proportional control is found by multiplying the speed ratio deviation RtoERR by the gain fbpDATA, a speed ratio feedback correction amount due to integral control is found by multiplying the speed ratio deviation RtoERR by the gain fbiDATA, and a speed ratio feedback correction amount due to proportional control is found by multiplying the speed ratio deviation RtoERR by the gain fbdDATA. These are then substituted into the following PID control equation known in the art to calculate the speed ratio feedback correction amount FBrto.

$$FBrto = RtoERR \cdot fbpDATA + \left(\int RtoERR\right) \cdot fbiDATA + \left(\frac{d}{dt} RtoERR\right) \cdot fbdDATA$$

The adder 85 adds the torque shift error correction value TSrto and the speed ratio feedback correction amount FBrto to the transient target speed ratio RatioO to calculate a compensated transient target speed ratio DsrRTO.

A target step number calculating unit 86 calculates a target number of steps DsrSTP of the step motor 4 corresponding to the compensated transient target speed ratio DsrRTO by looking up a map stored beforehand in the controller 61.

A step motor drive rate determining unit 88 determines a physical operating limit rate of the step motor 4 based on the oil temperature TMP of the transmission.

A step motor drive position command limiting unit 89 determines an allowable range of the command signal Astep based on a physical operation limit of the step motor 4. The allowable range is different depending on the initialization condition of the command signal when the controller 61 started its operation, i.e., if the vehicle was running when the command signal was initialized with respect to the actual operation position of the step motor 4. This function will be described later in detail.

A step motor drive position command computing unit 87 determines whether or not the step motor 4 can attain a target number of steps DsrSTP in the aforesaid speed ratio control cycle based on this physical operating limit rate. A value obtained by correcting the target step number DsrSTP based on the physical operating limit rate is set as the command signal Astep. Further, it applies the limitation to the command signal Astep according to the allowable range defined by the step motor drive position command limiting unit 89 and finally outputs the signal Astep to the step motor 4.

The command signal is therefore considered to correspond to the actual rotation position of the step motor 4.

The above functions of the controller 61 are materialized by performing routines shown in the flowcharts of FIGS. 4–11.

Figure 4:
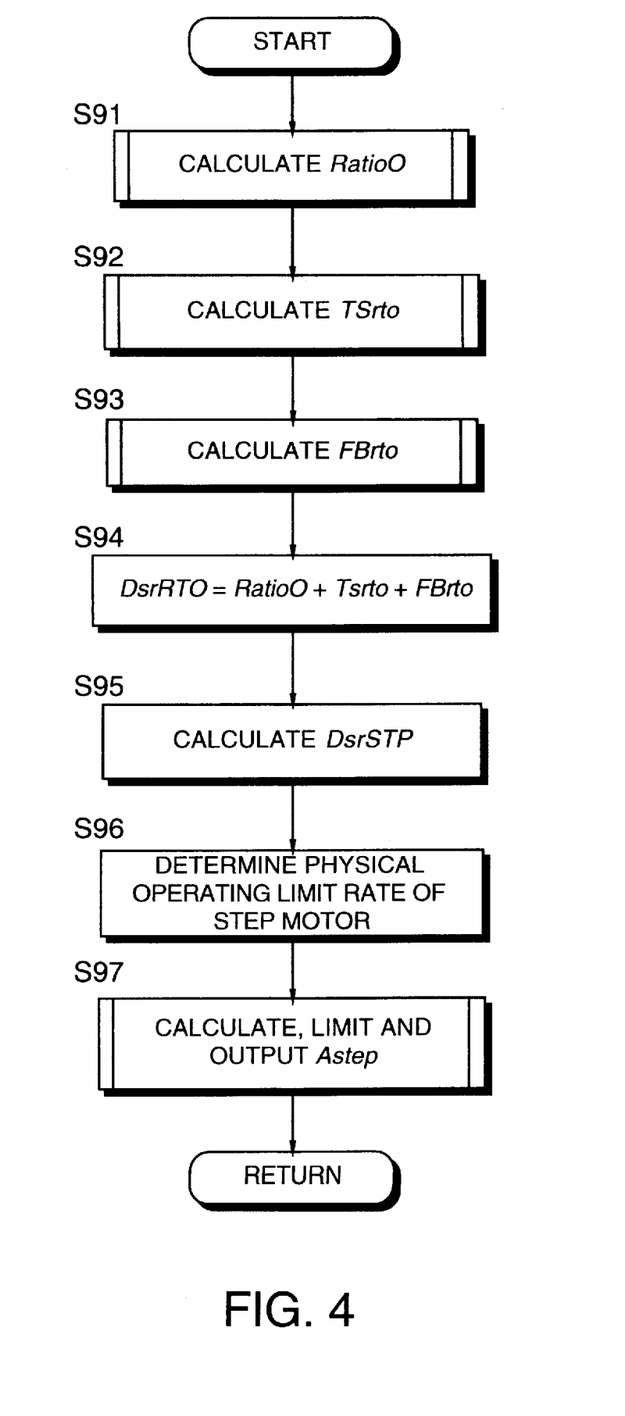
FIG. 4 is a flowchart describing a main routine of a speed ratio control performed by the controller.

FIG. 4 show s the flow of a main routine and FIGS. 5–8 and 10 show the flow of subroutines. All of these routines are repeatedly performed, for example, at an interval of 10 milliseconds.

Figure 9:
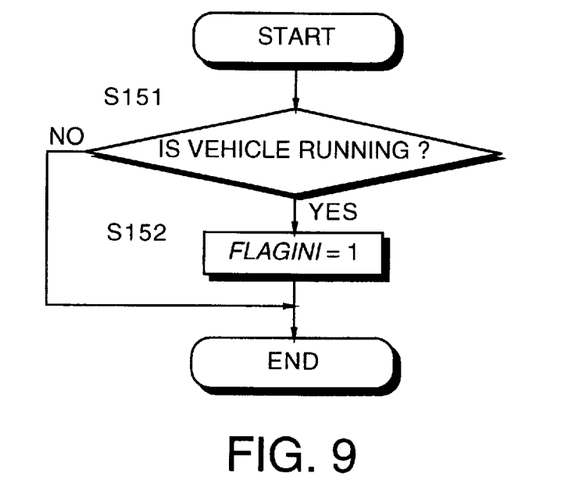
FIG. 9 is a flowchart describing a routine for initializing a command signal performed by the controller.

FIG. 9 shows a special routing for the initialization of the command signal. This routine is performed only once immediately after power supply to the controller 61 is started.

In a step S91 in the main routine of FIG. 4, the controller 61 calculates the transient target speed ratio RatioO.

In order to perform this calculation, the calculation of the final target input rotation speed Ni* and the final speed ratio i* are previously calculated by using the active speed ratio map. This step S91 is therefore equivalent to the function of the speed ratio map selecting unit 71, final input rotation speed calculation unit 72, final target speed ratio computing unit 73, speed ratio variation time constant calculating unit 74 and transient target speed ratio calculating unit 75 of the block diagram of FIG. 3.

Figure 5:
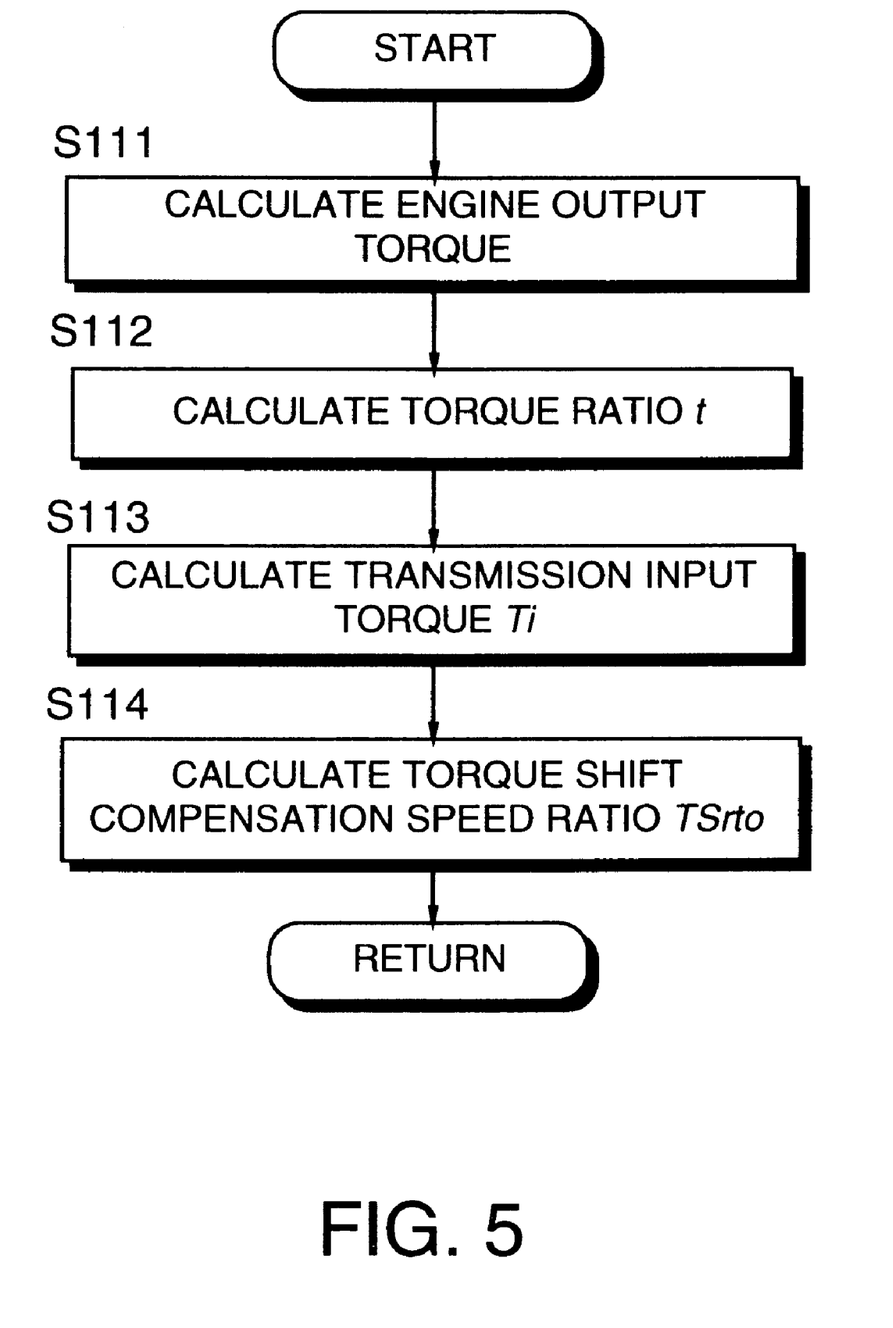
FIG. 5 is a flowchart describing a subroutine for calculating a torque shift error correction value TSrto performed by the controller.

In a step S92, the subroutine shown in FIG. 5 is used to calculate the torque shift error correction value TSrto.

This subroutine is equivalent to the function of the input torque calculating unit 76 and the torque shift error correction unit 77 of the block diagram of FIG. 3.

Describing this subroutine, in a step S111, the engine output torque is first calculated from the throttle opening TVO and the engine speed Ne referring to an engine performance map stored beforehand in the controller 61.

In a step S112, the torque ratio t which is the ratio of the input rotation speed and output rotation speed of the torque converter is calculated.

In a step S113, the engine output torque is multiplied by torque ratio t to calculate the transmission input torque Ti.

In a step S114, the torque shift error correction value TSrto is calculated from the transmission input torque Ti and the transient target speed ratio RatioO which was found in the step S91 of the main routine, by looking up the map stored beforehand in the controller 61.

After calculating the torque shift error correction value TSrto by the above subroutine, the main routine proceeds to a step S93 where the speed ratio feedback correction amount FBrto is calculated.

This calculation is performed by the subroutines of FIGS. 6–9.

Figure 6:
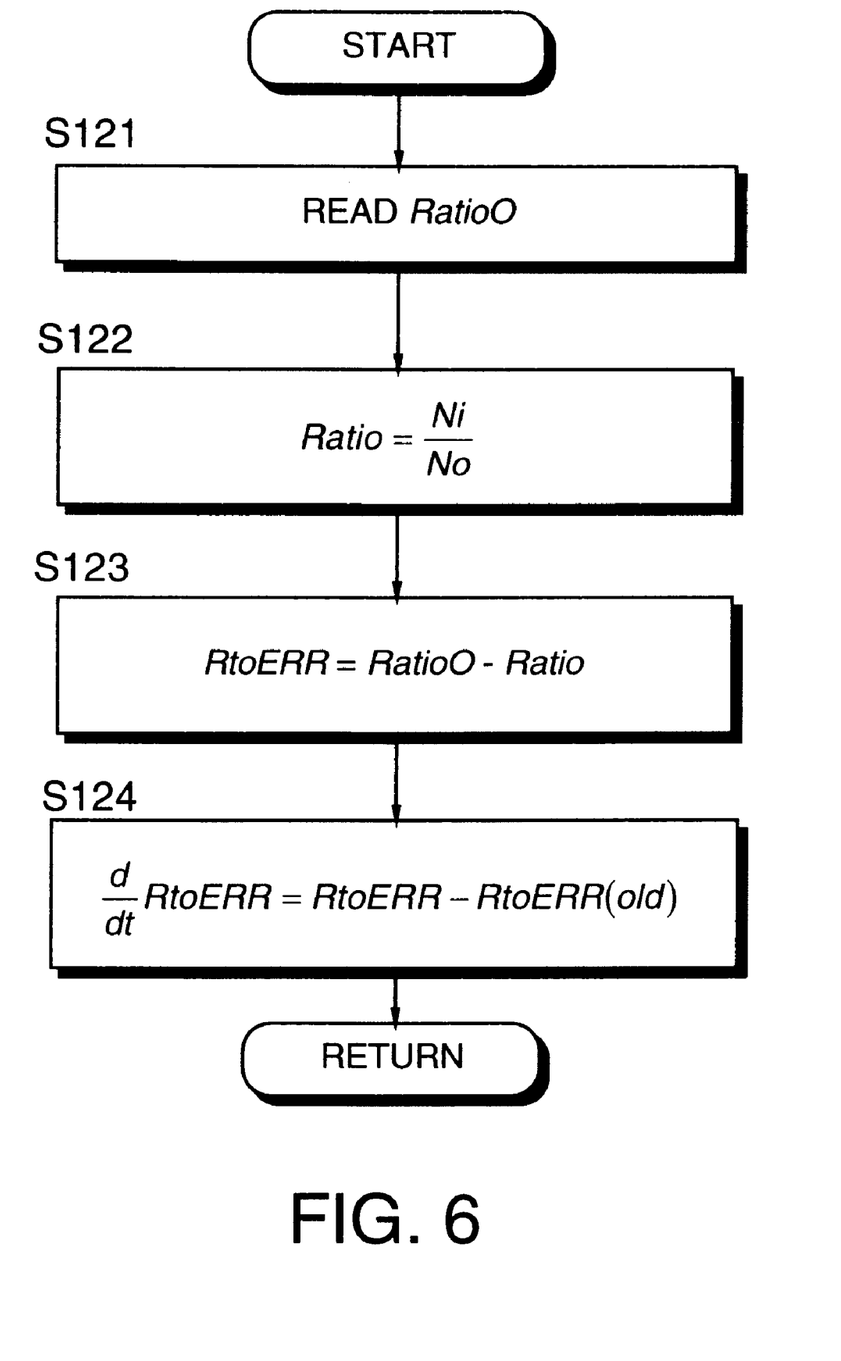

FIG. 6 shows a subroutine for calculating the speed ratio deviation RtoERR.

This subroutine is equivalent to the function of the real speed ratio calculating unit 78 and the speed ratio deviation calculating unit 79 in the block diagram of FIG. 3.

First, the transient target speed ratio RatioO is read in a step S121.

In a step S122, the rotation speed Ni of the input disk 1 is divided by the rotation speed No of the output disk 2 to calculate the real speed ratio Ratio of the continuously variable transmission.

In a step S123, the real speed ratio Ratio is deducted from the transient target speed ratio RatioO to calculate the speed ratio deviation RtoERR.

Further, in a step S124, a deviation between the speed ratio deviation RtoERR and the speed ratio deviation RtoERR(old) calculated on the immediately preceding occasion the routine was executed, i.e., 10 milliseconds before, is calculated as a difeferetial value of speed ratio deviation, $$\frac{d}{dt} RtoERR.$$

Figure 7:
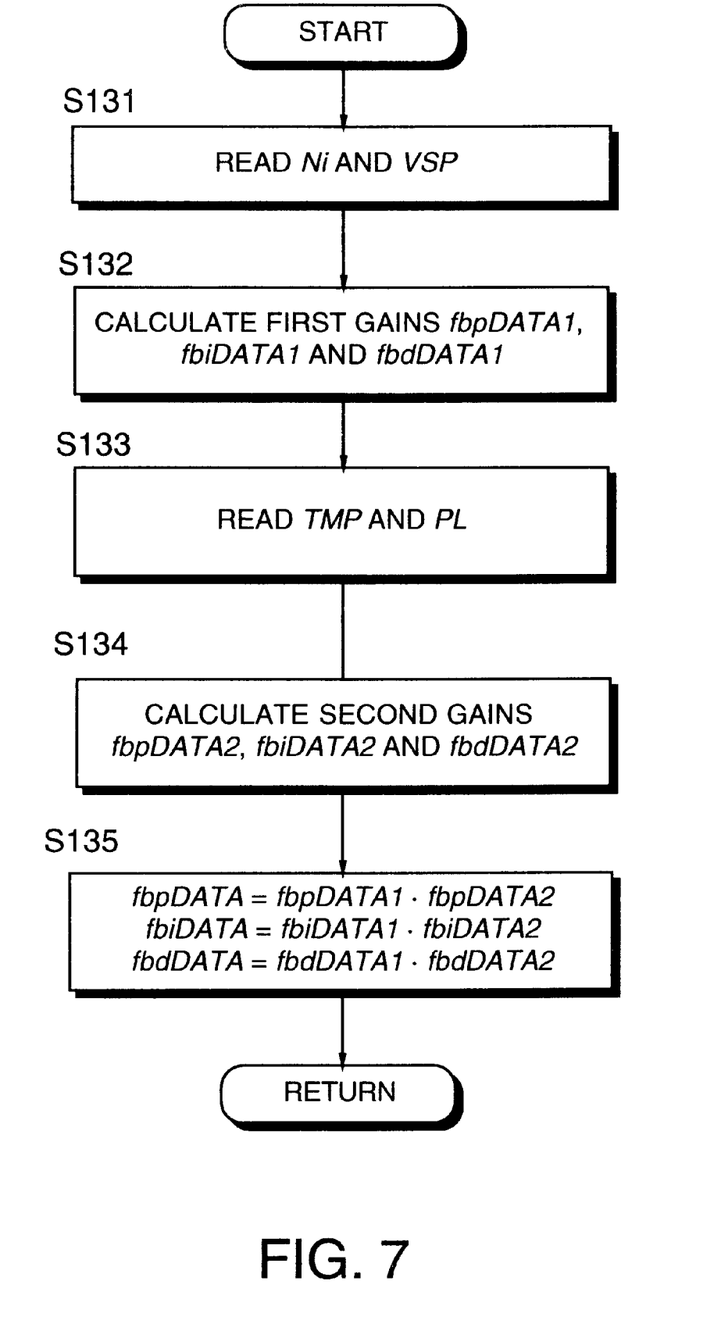
FIG. 7 is a flowchart describing a subroutine for calculating feedback gains performed by the controller.

FIG. 7 shows a subroutine which calculates the PID control feedback gain. This subroutine is equivalent to the functions of the first feedback gain calculating unit 80, the second feedback gain calculating unit 81 and the feedback gain calculating unit 83 in the block diagram of FIG. 3.

Describing this subroutine, first in a step S131, the vehicle speed VSP and a rotation speed Ni of the input disk 1 of the continuously variable transmission are read.

In a step S1232, a first proportional control feedback gain fbpDATA1, first integral control feedback gain fbiDATA1 and first differential control feedback gain fbdDATA1 are calculated by looking up the maps stored beforehand in the controller 61 as mentioned above based on VSP and Ni.

In a step S133, the oil temperature TMP and the line pressure PL are read.

In a step S134, a second proportional control feedback gain fbpDATA2, second integral control feedback gain fbiDATA2 and second differential control feedback gain fbdDATA2 are calculated by looking up the maps stored beforehand in the controller 61 as mentioned above based on TMP and PL.

In a step S135, the proportional control feedback gain fbpDATA, integral control feedback gain fbiDATA and differential control feedback gain fbdDATA are calculated by multiplying the first gains by corresponding second gains.

Figure 8:
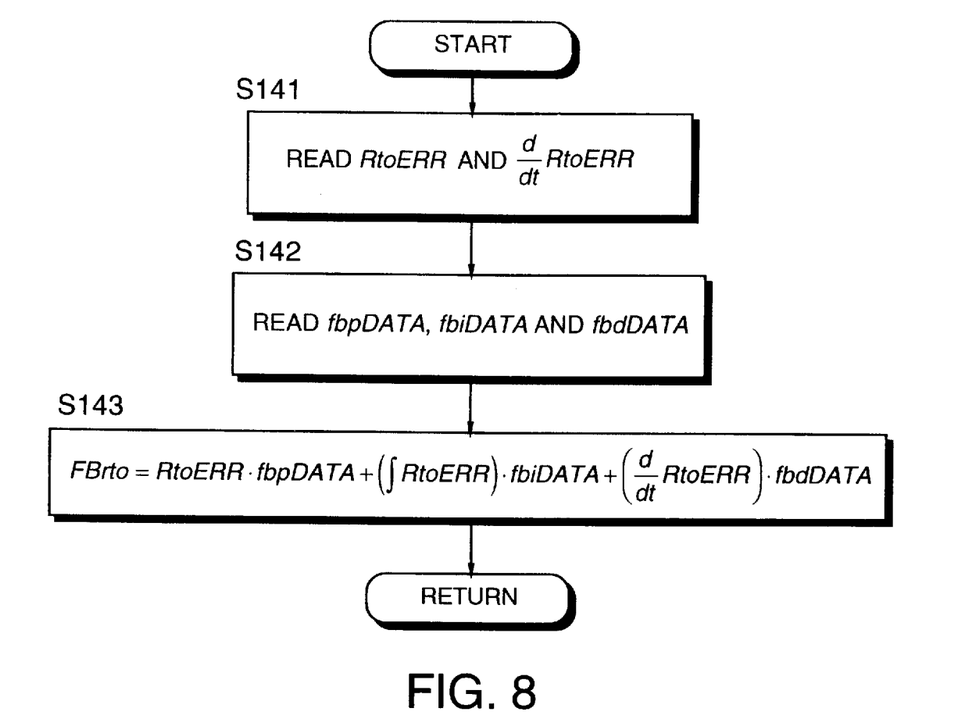
FIG. 8 is a flowchart describing a subroutine for calculating a speed ratio feedback correction amount FBrto performed by the controller.

FIG. 8 shows a subroutine for calculating the speed ratio feedback correction amount FBrto due to PID control, and the limited speed ratio feedback correction amount LmFBrto.

This subroutine is equivalent to the functions of the PID control unit 84 in the block diagram of FIG. 3.

In this subroutine, in a step S141, the speed ratio deviation RtoERR and its differential value $$\frac{d}{dt} RtoERR,$$

both of which were calculated by the subroutine of FIG. 6, are read.

In a next step S142, the feedback gains fbpDATA, fbiDATA and fbdDATA which were found in the subroutine of FIG. 7, are read.

In a step S143, the speed ratio feedback correction amount FBrto is calculated by the following equation.

$$FBrto = RtoERR \cdot fbpDATA + \left( \int RtoERR \right) \cdot fbiDATA + \left( \frac{d}{dt} RtoERR \right) \cdot fbdDATA$$

After calculating the speed ratio feedback correction amount FBrto in the step S93 by using the subroutines of FIGS. 6–9, the main routine proceeds to a step S94.

Herein, the compensated transient target speed ratio DsrRTO is computed by the following equation.

This is equivalent to the function of the adder 85 in the block diagram of FIG. 3.

DsrRTO=RatioO+TSrto+FBrto where, RatioO=transient target speed ratio,
TSrto=torque shift error correction value, and
FBrto=speed ratio feedback correction amount.

In a following step S95, the target number of steps DsrSTP of the step motor 4 for attaining the compensated transient target speed ratio DsrRTO is calculated by looking up the map as mentioned above. This step is equivalent to the function of the target step number calculating unit 86 in the block diagram of FIG. 3.

In a following step S96, the physical operating limit rate of the step motor 4 is determined based on the oil temperature TMP of the transmission. This step is equivalent to the function of the step motor drive rate determining unit 88 in the block diagram of FIG. 3.

In a final step S97, the command signal Astep is calculated by correcting the target step number DsrSTP calculated in the step S95 based on the physical operating limit rate determined in the step S96.

Further, the command signal Astep is limited by upper and lower limiting values which define the aforesaid allowable range of the command signal Astep based on the physical operation limit of the step motor 4. These upper and lower limiting values are calculated by a subroutine shown in FIG. 10.

The controller then outputs the command signal Astep after the limitation to the step motor 4 and the main routine is terminated. This step is equivalent to the function of the step motor drive position command calculating unit 87 and the step motor drive position command limiting unit 89 in the block diagram of FIG. 3.

Next, the subroutine of FIG. 10 will be described by referring to a command signal initializing routine shown in FIG. 9.

The command signal initializing routine of FIG. 9 is a routine for performing an initialization of the command signal such that it coincides with the actual operation position of the step motor 4. This routine is different from the other routine and subroutines in that it is performed only once immediately after power supply to the controller 61 is started.

The routine determines in a step S151 if the vehicle is running by the following method. When either of the conditions that the vehicle speed VSP is not less than a predetermined vehicle speed and that the input rotation speed Ni detected by the rotation speed sensor 64 is not less than a predetermined rotation speed is satisfied, the routine determines that the vehicle is running.

This routine is performed immediately after power supply to the controller 61 is started before performing the other routine and subroutines. So the decision that the vehicle is running means that the power supply to the controller 61 is started while the vehicle is running. This situation occurs when the power supply to the controller 61 has stopped while the vehicle is running and is subsequently resumed.

When the determination result in the step S151 is affirmative, the initialization of the command signal based on the actual operation position of the step motor 4 is performed in a step S152. As mentioned in the background of the invention, this initialization involves the process of estimating the actual operation position of the step motor 4 form the real speed ratio Ratio of the transmission and modulating the command signal so as to coincide with the actual operation position of the step motor 4. The initialization process is identical to that of the aforesaid prior art Tokkai Hei 8-178063. After performing this initialization, a flag FLAGINI is set equal to 1 and the routine is terminated. Since the flag FLAGINI is reset to 0 when power supply to the controller 61 is started, the initial value of the flag FLAGINI is 0.

When the determination result in the step S151 is negative, the routine skips the step S151 and is immediately terminated. In this case, another initializing routine of the command signal specifically for the case where the vehicle is not running is performed before performing the routine and subroutines of FIGS. 4–8 and 10. Since this initialization routine is also known by the aforesaid prior art Tokkai Hei 8-178063, the explanation of the routine is omitted.

Figure 10:
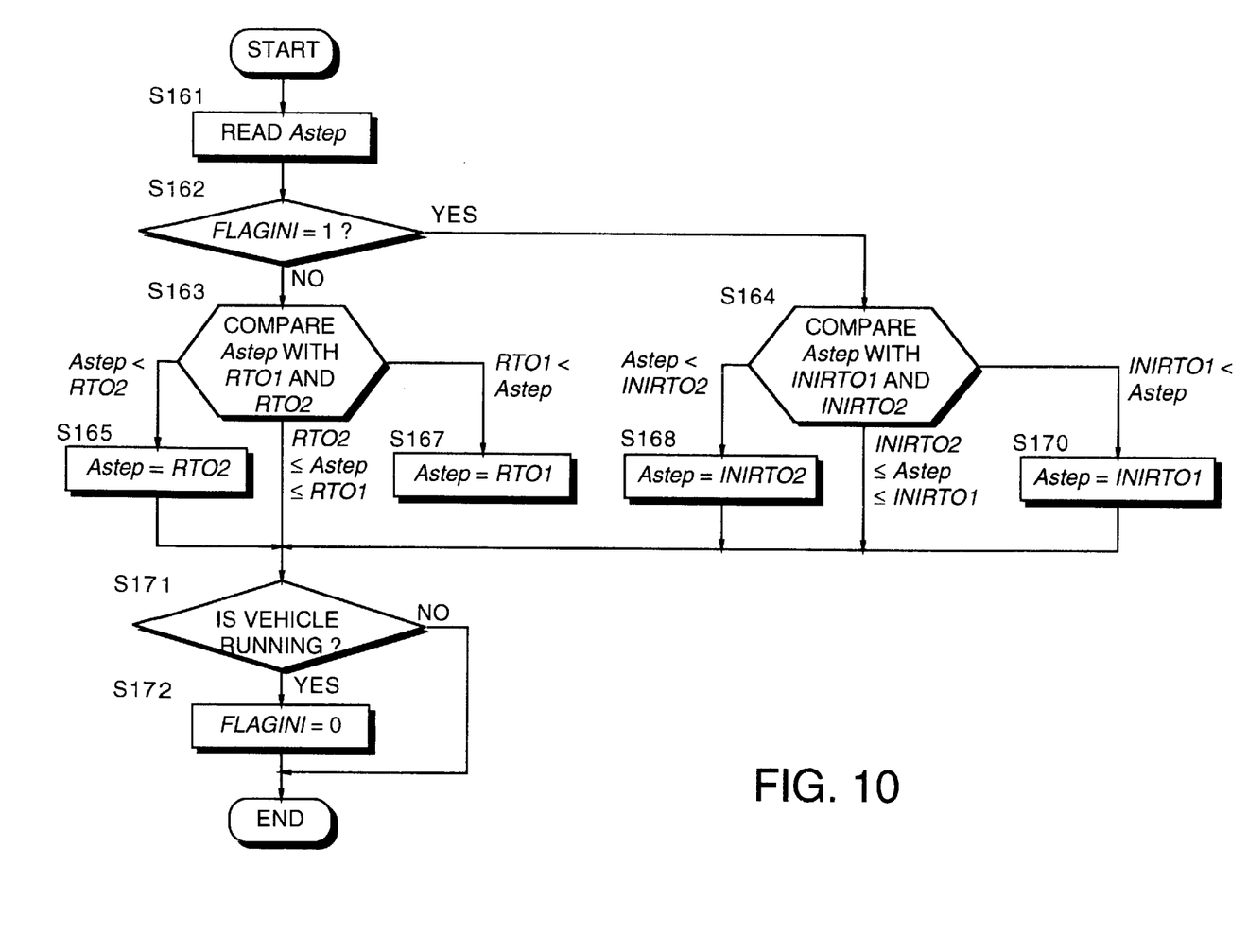
FIG. 10 is a flowchart describing a subroutine for applying a limitation to the command signal performed by the controller.

The controller determines the upper limiting value and the lower limiting value of the command signal Astep according to the value of the flag FLAGINI by the subroutine of FIG. 10.

The subroutine first reads the command signal Astep in a step S161.

In a next step S162, it is determined if the FLAGIN is equal to 1.

When the flag FLAGIN is equal to 1, the subroutine proceeds to a step S163, and when the flag FLAGIN is not equal to 1, the subroutine proceeds to a step S164.

In the step S163, the command signal Astep is compared with an upper limiting value RTO1 and a lower limiting value RTO2 for the normal operation. These limiting values correspond to the physical operation limits of the step motor 4.

When the command signal Astep is smaller than the lower limiting value RTO2, it is corrected to be equal to RTO2 in a step S165. When the command signal Astep is a value between the lower limiting value RTO2 and the upper limiting value RTO1, the subroutine does not correct the command signal Astep. When the command signal Astep is larger than the upper limiting value RTO1, it is corrected to be equal to RTO1.

In the step S164, the command signal Astep is compared with an upper limiting value INITRTO1 and a lower limiting value INITRTO2 which are the limiting values specifically defined for the case where the initialization of the command signal is performed while the vehicle is running. The upper limiting value INITRTO1 is set smaller than the upper limiting value RTO1 for the normal operation, and the lower limiting value INITRTO2 is set larger than the lower limiting value RTO2.

When the command signal Astep is smaller than the lower limiting value INITRTO2, the command value Astep is corrected to be equal to INITRTO2 in a step S168. When the command value Astep is a value between the lower limiting value INITRTO2 and the upper limiting value INITRTO1, the subroutine does not correct the command signal Astep. When the command signal Astep is larger than the upper limiting value INITRTO1, it is corrected to be equal to INITRTO1 in a step S170.

After the command value Astep is thus limited, the subroutine proceeds to a step S171. Herein, it is determined if the vehicle is running from the speed VSP. When the vehicle is not running, the flag FLAGIN is reset to 0 in a step S172 and the subroutine is terminated. When the vehicle is running, the subroutine is immediately terminated without resetting the flag FLAGIN.

When power supply to the controller 61 is once stopped and resumed while the vehicle is running, therefore, the allowable range of the command signal Astep is narrowed until the vehicle stops. When power supply is resumed, the controller first initialize the command signal Astep with respect to the actual operation position of the step motor 4, but since the vehicle is running, the initialization result may not be very accurate because the aforesaid torque shift error is introduced in the initialization. However, the allowable range of the command signal Astep is narrowed until the vehicle stops, the command signals Astep output to the step motor 4 will not command the operation of the step motor 4 beyond its physical operation limits.

When the command signal Astep exceeds the physical operation limits of the step motor 4, a deviation of the actual operation position of the step motor 4 from the command signal Astep appears and a driver of the vehicle may experience some discomfort due to this deviation. Since the effect of this deviation is more conspicuous to the driver when the speed ratio is large than when it is small, it is also possible to set the upper limiting value INITRTO1 smaller than the upper limiting value RTO1 for the normal operation while the lower limiting value INITRTO2 is set equal to the lower limiting value RTO2 for the normal operation.

The contents of Tokugan Hei 10-225892, with a filing date of Aug. 10, 1998 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, in the above embodiments, the oil pressure control valve is driven by a rotational step motor, but this invention may be applied to the case where the oil pressure control valve is driven by a linear step motor or servo motor associated with a pulse encoder.

The embodiments of this invention in which an exclusive property or privilege is claimed are defined as follows:

What is claimed is:

1. A speed ratio controller for a toroidal continuously variable transmission of a vehicle, said transmission comprising a motor varying an operation position according to a command signal so as to vary a speed ratio of said transmission, said controller comprising:

a sensor for detecting a running condition of the vehicle, a sensor for detecting that the vehicle is running, a sensor for detecting a real speed ratio of said transmission, and a microprocessor programmed to:

perform, when the vehicle is running, an initialization of said command signal with respect to an actual operation position of said motor based on the real speed ratio of the transmission;

determine a target speed ratio based on the running condition of the vehicle;

determine the command signal based on the target speed ratio;

limit the command signal within a first limiting range which is narrower than a second limiting range corresponding to a physical operation limit of the transmission, after said initialization is performed; and output the command signal after limiting, to the motor.

2. A speed ratio controller as defined in claim 1, wherein said microprocessor is activated by power supply, and said microprocessor is further programmed to perform said initialization only once, when the vehicle is running when the microprocessor is activated.

3. A speed ratio controller as defined in claim 2, wherein said microprocessor is further programmed to limit the command signal to the second limiting range when said initialization is not performed.

4. A speed ratio controller as defined in claim 1, wherein said motor comprises a rotational step motor.

5. A speed ratio controller as defined in claim 1, wherein said microprocessor is further programmed to continue limiting the command signal to the first limiting range after said initialization is performed, until the vehicle stops running.

6. A speed ratio controller for a toroidal continuously variable transmission of a vehicle, said transmission comprising a motor varying an operation position according to a command signal so as to vary a speed ratio of said transmission, said controller comprising:

means for detecting a running condition of the vehicle, means for detecting that the vehicle is running, means for detecting a real speed ratio of said transmission, means for performing, when the vehicle is running, an initialization of said command signal with respect to an actual operation position of said motor based on the real speed ratio of the transmission, means for determining a target speed ratio based on the running condition of the vehicle, means for determining the command signal based on the target speed ratio, means for limiting the command signal within a first limiting range which is narrower than a second limiting range corresponding to a physical operation limit of the transmission, after said initialization is performed, and means for outputting the command signal after limiting, to the motor.

7. A speed ratio control method of a toroidal continuously variable transmission of a vehicle, said transmission comprising a motor varying an operation position according to a command signal so as to vary a speed ratio of said transmission, said method comprising:

detecting a running condition of the vehicle, detecting that the vehicle is running, detecting a real speed ratio of said transmission, performing, when the vehicle is running, an initialization of said command signal with respect to an actual operation position of said motor based on the real speed ratio of the transmission, determining a target speed ratio based on the running condition of the vehicle, determining the command signal based on the target speed ratio, limiting the command signal within a first limiting range which is narrower than a second limiting range corresponding to a physical operation limit of the transmission, after said initialization is performed, and outputting the command signal after limiting, to the motor.

* * * * *